May 21, 1935.　　R. R. WILLIAMS ET AL　　2,002,461
RUBBER INSULATION FOR SUBMARINE CABLES
Filed Dec. 4, 1923
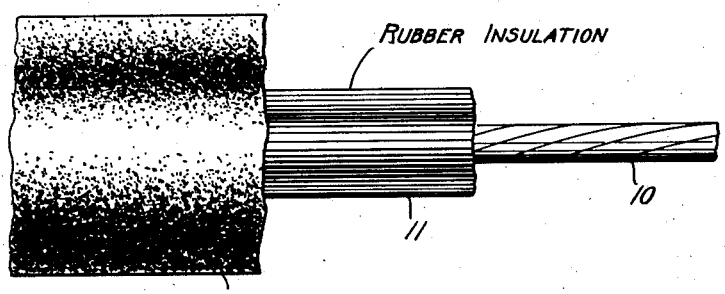
INVENTORS: R. R. WILLIAMS
A. R. KEMP
ATTORNEY Patented May 21, 1935

2,002,461

UNITED STATES PATENT OFFICE 2,002,461

RUBBER INSULATION FOR SUBMARINE CABLES

Robert R. Williams, Roselle, and Archie R. Kemp, East Orange, N. J., assignors to Western Electric Company, Incorporated, New York, N. Y., a corporation of New York Application December 4, 1923, Serial No. 678,509

1 Claim. (Cl. 106—13)

The invention relates to submarine cable, an insulating material therefor and a method for producing said insulating material.

Its objects are the production of submarine cables of high quality, long life and low cost and of an improved insulating material especially adapted therefor from readily obtainable and inexpensive substances possessing low specific inductive capacity and low dielectric losses, adapted for prolonged use in sea water without substantial deterioration and approximately as good in these respects as gutta percha.

In accordance with the invention a cable having the electrical and mechanical characteristics necessary to attain the above objects is obtained by applying to the usual cable conductor an insulating material compounded of rubber and a filler both of which are substantially free of water soluble material. Such a cable is shown diagrammatically in the attached drawing.

A characteristic of the cable is that when immersed in sea water the insulating material will not absorb more water than the sum of the water absorbed by the components of which the insulating material is made. Contributing to this characteristic last mentioned is an intimate union of the filler and the rubber.

The filler material is characterized by freedom from water soluble matter, by a dielectric constant approximating that of rubber, by the property of entering into an intimate contact with the rubber and by a substantially equi-dimensional form of the filler particle.

The invention also relates to a method of treating the rubber to remove therefrom substantially all of the water soluble matter, and a method of incorporating with the rubber so treated a suitable filler and imparting to the resulting insulating material the rigidity necessary to hold the conductor properly centered therein.

For the past seventy years gutta percha has been recognized as the standard submarine cable insulating material. Ever since 1860 attempts have been made to use rubber compounds for submarine cable insulation without success.

In accordance with this invention cables may be insulated with rubber instead of gutta percha without any sacrifice in the rate of transmission of messages, length of life, constancy of electrical characteristics or other desirable property, and this at a greatly reduced cost.

An electric submarine cable comprises as shown in the attached drawing one or more conductors 10 surrounded by, or embedded in, insulation 11, which in turn is surrounded by other materials 12 to give mechanical strength to the cable and protection to the insulation and conductors. The sea water itself ordinarily forms the return conductor of the electrical circuit and readily penetrates the outermost portions of the cable and comes in intimate contact with the insulation. At the depths to which submarine cable is frequently laid the pressure of the sea water upon the insulation is of the order of 5000 pounds per square inch. It is generally understood that rubber is a material which resists the penetration of water, but prior to this invention it had been noted by several observers that some water appears to be absorbed by rubber insulation after prolonged contact therewith. The rate of this absorption, however, its nature, its amount and its effect upon the electrical properties of the rubber were unknown.

At the outset of the investigation which led to this invention, it was realized that the electrostatic capacity and resistivity of rubber insulation must, to some extent, be dependent upon the nature and quality of each of the ingredients including the rubber itself, sulphur, the mineral or organic substances used as fillers for the rubber, and materials used for special purposes, such as vulcanizing accelerators; it seemed probable that the inferiority of rubber to the best grades of gutta percha was due to some one or two of these ingredients only, the ill effects of the others being negligible, but the whole subject rested in obscurity. A study of the effects of the variables was therefore undertaken. It was found very difficult to isolate the various effects and it was not until the investigation had proceeded several years that the discoveries disclosed herein were made and verified. The discoveries made are here briefly stated in order. They are later fully explained and their application made clear. They are:

*First:*—In a mechanically well made cable in which the usual form of rubber insulation is employed, the early rapid changes of electrical characteristics followed by the later progressively slower changes are due in large part to impurities contained in the insulating rubber covering of such a nature that osmotic action is established resulting in the absorption of large and varying amounts of water from the sea.

*Second:*—A certain and definite amount of water is dissolved in the rubber, as distinguished from being introduced by osmotic effect. This action is completed relatively soon since the amount dissolved is small. It is also essentially uniform in various grades of rubber and therefore calculable in advance. This water, of course, penetrates to all parts of the body of the rubber.

*Third*:—The amount of water absorbed due to osmotic action may be lessened to a marked degree by maintaining or increasing the rigidity of the rubber matrix.

*Fourth*:—Filling materials heretofore used in rubber cable insulation, such as whiting and talc are slightly soluble in water or are capable of forming a hydrate with water. This results in an increased value of capacitance and dielectric loss and also sets up or augments deleterious chemical reactions with other ingredients of the rubber compound.

*Fifth*:—Materials used as fillers for rubber may contain or be associated with small amounts of impurities which are soluble in water and so increase the amount of water absorbed by osmotic action and also increase the capacitance and dielectric losses.

*Sixth*:—Rubber has been looked upon as a material having such adhesive properties as to cause a substantially perfect union between itself and filling materials of the nature ordinarily used. It is found, however, that a union between the rubber matrix and the filling material which for ordinary uses would be considered perfect may be too imperfect for the present purpose. When water penetrates to the surfaces of contact by being dissolved in the rubber it accumulates in any space or voids which exists, or pockets filled with water soluble matter, to the serious detriment of the electrical characteristics of the insulation.

*Seventh*:—When mineral fillers are embedded in rubber, the coarser the filler the greater is the electrical stability, so long at least as the greatest dimension of a filler particle is small compared with the thickness of the insulation.

*Eighth*:—Excessive losses of electrical energy in a submarine cable may be due to the use of insulation in which the filler is made up of flat, flaky, or long particles, the electric forces setting up a turning moment in each particle that does not lie endwise or flatwise.

The rubber insulation of a submarine cable may be looked upon as a dielectric between two plates of a condenser, one being the sea water and the other the copper conductor. When a signaling voltage is impressed upon the cable this condenser first becomes charged throughout the length of the cable before a current of the necessary size can flow at the distant end. It is customary to signal by impressing positive and negative impulses upon the cable in various combinations and, due to the condenser effect, it is necessary to signal slowly to permit the current at the receiving end to reach the proper volume before the succeeding impulse is transmitted. For this reason it is highly desirable to obtain insulating material with a low electrostatic capacity or dielectric constant. The best grades of gutta percha have a dielectric constant in the neighborhood of 3 and that of the rubber employed in rubber insulation is about 2.7. The fillers heretofore used in rubber insulation for submarine cables have had specific inductive capacities much higher than gutta percha (which is used without being filled) so that the specific inductive capacities of the rubber compounds have been considerably higher than that of gutta percha.

During the above mentioned investigation, but before the more important of the above enumerated discoveries had been made and verified, Robert R. Williams, who was in charge of the investigation developed a new mineral filling material having unusually low specific inductive capacity—3.5 to 3.7. This material is ground fused quartz and is disclosed and claimed in U. S. Patent No. 1,415,076, May 9, 1922. It has proved to be one of the best filling materials known for submarine insulation. Another suitable filling material which has an even lower dielectric constant is hard rubber dust prepared as described below.

Water has a dielectric constant twenty or thirty times as great as rubber. If, therefore, large amounts of water are introduced into the rubber, as this investigation has shown to be the case, the dielectric constant will increase and continue to increase as long as the absorption of water continues. It is now clear that as soon as the cable having the usual form of rubber insulation is laid, water begins to penetrate into the rubber by being dissolved therein and thus comes in contact with the water soluble matter present as impurities in the rubber or the filler or both, and dissolves it. The solution thus formed is concentrated because of the relatively small amount of water. This brings into play the familiar phenomenon called osmosis which occurs when two solutions of different concentration are on opposite sides of a separating wall which is capable of allowing water to pass while more or less forbidding the substances in solution to pass. Under such conditions water will slowly work through the wall until the solutions are of the same concentration on both sides of it. In this way the presence of small amounts of soluble matter will cause a long drawn out absorption of large amounts of water. When an appreciable amount of water soluble matter in the rubber is present, water will continue to work its way into the rubber until a condition of equilibrium is established. No appreciable amount of sea salt is carried into the rubber by this action and no appreciable amount of water soluble impurity is released from the insulation except at an extremely slow rate such that years would be required to produce an appreciable effect in a cable of the usual dimensions. In thin sheets of the material the leaching out of certain soluble materials is readily detected.

The discovery of this osmotic action resulted from immersing samples of rubber, as ordinarily prepared, in sea water and in fresh water. By weighing the samples after they had been immersed for a long period of time it was found that fresh water was absorbed more extensively than salt water. Verification of the theory was then sought by investigating samples of rubber after immersion in salt solutions of various concentrations and also by removing portions of soluble matter from the rubber and by milling into the rubber large and known amounts of soluble matter. The results have demonstrated the correctness of the theory. However, the quantity, molecular weight, degree of ionization, solubility in water and diffusibility through rubber of the soluble matters present greatly complicated the problem and for a long time, obscured the results. In accordance with this invention the evil effects of this osmotic action are eliminated by removing from the rubber and filler the water soluble impurities. In the case of plantation Hevea rubber the most important water soluble constituent is quebrachitol, although numerous other water soluble substances are present in smaller amount. It is apparent that substances having a high degree of solubility in water are more objectionable than those of lesser solubility. It is, of course, impossible to eliminate all traces of these harmful substances by any commercially practical process. But osmotic action is for all practical purposes negligibly small when the total water absorption of the insulation in salt water is reduced to the small value of .5 to 1% of the weight of the rubber when dry. Methods for reducing the absorption to the desired extent are described below.

It is found, as stated above, that there is a certain absorption of water by rubber not due to osmotic action. All indications point to this as a case of solution of the water in the rubber or rubber insulation. This absorption is relatively soon completed and is determinable in advance since the amount is essentially uniform for various grades of rubber. The amounts of water dissolved will average about ½% of the weight of the rubber if the samples are immersed in sea water at 70° F. The time for saturation at ordinary temperatures is approximately twenty-five days with a rubber sheet 1/20 inch thick.

The saturation of the rubber in this manner is accompanied by substantial changes in electrical characteristics, which however in the case of rubber prepared in accordance with this invention are calculable in advance. Moreover, since these changes occur in short periods of time, they are brought practically to an end before the cable is laid. This may be accomplished by carrying out the vulcanization of the insulation in a wet atmosphere, or while submerged in water or an aqueous liquid or by immersing the finished core in water for some weeks during or after the manufacture of the cable but prior to its laying. This is conveniently done as the usual program of tests during manufacture requires almost continuous immersion in water.

It has been pointed out that removal of water soluble matters from the rubber is necessary to decrease or eliminate osmotic swelling. On the other hand attention has been called to the influence of rigidity upon osmotic swelling. This is due to the fact that although an osmotic pressure may be established the rigidity of the material offsets this pressure and more or less completely prevents swelling. This principle is illustrated by hard rubber which in dust form is disclosed below as a suitable filler for soft rubber submarine insulation. Hard rubber is so rigid that very little, if any, osmotic swelling occurs in it even when water soluble matter is present in the rubber. A form of rubber insulation in which rigidity is depended upon to a greater extent to protect against osmotic swelling is described and claimed in a Patent 1,689,312, issued to R. R. Williams on October 30, 1928. In the form of insulation herein disclosed and claimed the factor of rigidity of the rubber matrix is also important and is controlled by means described below.

As stated above, it has been discovered that the specific inductive capacity and dielectric loss of rubber insulation may be adversely affected by the solubility of fillers which have heretofore been used and which in some cases are so nearly insoluble in water that for ordinary purposes their slight solubility would be negligible. The water which enters forms with the filler a solution which has high conductivity, thereby contributing to the hysteresis losses in the insulation, due apparently to ion movement. Hard rubber dust is not open to this objection as it is, of course, insoluble in water the same as the rubber matrix. So far as absorption of water by hard rubber dust, due to being truly dissolved therein, is concerned, the action of this material as a filler is similar to that of the rubber matrix. In both cases the absorption is relatively soon completed because it is small. Ground fused quartz in addition to having a very low dielectric constant, as pointed out above, likewise meets this further requirement of insolubility in water.

To obtain the best results with ground fused quartz, however, additional treatment is necessary in view of the further discovery mentioned above, that the union between the rubber and the filler, while sufficiently perfect for ordinary purposes, may be quite deficient for submarine cable insulation. In such case microscopic examination may show that the contact between the particles of filler and rubber is modified by the presence of a minute layer of gas or air between them, and this is true of fused quartz. In the case of hard rubber dust on account of its fusibility at vulcanizing temperatures a substantially perfect union is readily established between the filler and the matrix, thus obviating all danger of spaces or voids existing at the surfaces of the filler particles in which water will accumulate. When such voids are present in the insulation, absorption of water in the presence of the merest traces of water soluble impurities causes dielectric losses, at the higher frequencies which are now used in signaling over cables, as much as one hundred times as great as when the rubber is prepared in accordance with this invention. This seems to be due to ion movement. The injurious effect of the presence of soluble matter upon the electrostatic capacity is also greater in case the soluble matter is localized in the interfaces between filler and matrix as is most likely to be the case when the filler is contaminated with soluble mineral matter.

It was found that if fused silica is reduced to a fineness beyond a certain point the electrical stability of a rubber compound prepared therefrom is thereby decreased although the mechanical strength of the compound is simultaneously increased. Investigation of this peculiar result led to the conclusion that even when the greatest precautions are taken the point of greatest electrical weakness in a mineral filled rubber compound is in the bond between the rubber matrix and the filler particle. Accordingly, when the area of the interface is least, a condition which is met when the filler particles are coarsest, the electrical stability is greatest. On the other hand the mechanical strength depends upon friction between matrix and filler and this friction is greatest when the interface is greatest. In accordance with these observations a fineness of filler is selected which will yield a product of the necessary tensile strength but greater fineness is avoided to obviate electrical instability. In the case of the fused silica the material is ground till a sample will just completely pass a sieve of 200 meshes per lineal inch.

However, it is not true that all fine fillers produce electrically unstable compounds because other factors often enter in to an important degree. For example zinc oxide is one of the finest rubber fillers known and also produces a relatively stable electrical insulating compound. An investigation of this matter led to the discovery that zinc oxide adsorbs atmospheric gases upon its surfaces to a very much smaller degree than any other filler investigated and further that, other things being equal, the less the amount of adsorbed gas per unit area of filler surface at the time of compounding the greater is the electrical stability of the rubber compound prepared therefrom.

These factors have an important bearing upon the percentage of filler which is compounded with rubber to produce a satisfactory submarine insulation. The choice is toward low dielectric constant and a high degree of stability on the one hand and on the other good mechanical properties, chiefly the consistency of the uncured compound, which render the material adaptable to manufacturing operations such as extrusion and vulcanization. A ratio of volume of filler to volume of rubber of about one to three is usually desirable for high grade insulation.

Care should be taken to avoid a filler which is made up of flat, flaky or long particles. Other things being equal the best materials for the fillers are those which when ground to the fineness necessary to give desired mechanical properties of the rubber compound as dictated by the experience of the rubber worker will, when examined with a microscope, appear as particles substantially equidimensional as to form differing in size perhaps, but each particle having its thickness roughly the same in whatever way measured, as for example, like spheres, cubes or lumps of anthracite coal rather than like sticks, bricks or mica flakes. Hard rubber and quartz when finely ground provide a filler particle which is substantially equidimensional as to form. The advantage of filler particles of the equidimensional form will be seen by considering the action of a mica flake embedded in the rubber insulation of a submarine cable. During the time of making the change in current strength which constitutes the electrical signal, electric attractive forces are in play. In the case assumed, the mica has a higher dielectric constant than the rubber. Now when the current is flowing into or out of the cable at the beginning or end of a signal, the piece of mica, unless it happens to be exactly flatwise or endwise, will endeavor to turn itself against its rubber surroundings and such straining is a source of loss. When the particle is substantially equidimensional in form the energy loss due to the slight turning of the flatter particles is eliminated. When very rapid working or telephoning is going on such losses are very undesirable. Losses due to the character of the dielectric material have generally been designated by the phrase "dielectric hysteresis losses", but heretofore the effect of proper shaping of the filler particles so as to reduce or avoid these losses has not been realized so far as known. Both ground fused quartz and ground vulcanized rubber are well adapted to be properly shaped to avoid these effects.

The following is the present preferred method of carrying out that portion of the invention which relates to the preparation of the rubber matrix. As well understood by those familiar with the manufacture of submarine cable, the quality of gutta percha insulation may be varied somewhat to meet specific requirements. Likewise, when the method about to be described is employed it may be necessary to modify it somewhat to meet similar specific requirements.

Crude Hevea rubber of good commercial quality is passed through washing rolls in running water in the usual manner to produce a thin crepe in which a large surface of rubber is exposed. The creped sheets are loosely stacked in a suitable tank and covered with clean fresh water, in which they are allowed to soak for about one week. The water is drained off, the sheets are turned over and the water is renewed every two or three days. After a week of soaking the rubber is recreped to expose new surfaces and again soaked for about a week in a fresh supply of water. The rubber is then washed in a continuous type of rubber washer in a constantly renewed supply of water for the period determined to be necessary in order that the finished material shall pass the test prescribed below. In a Werner and Pfleiderer washer operating under the usual conditions one to two hours washing is sufficient.

For soaking and washing, water is used which is not only mechanically clean but also free from dissolved solids in excess of 200 parts per million. The temperature of the water used during creping is 130° to 180° F. and during the soaking about 70° to 80° F. During the final washing the temperature is kept as low as practicable. At the beginning of this washing the temperature may be as high as 150° F. but is lowered as the toughness of the rubber is reduced by heat and working so that at the end of a two hour washing period the temperature is about 100° to 110° F. If soft varieties of rubber are employed the washing temperatures are appropriately reduced.

The necessary periods of soaking and washing are determined by the following test. A sample of the rubber is taken out from time to time during the process and is thoroughly dried and formed into a sheet 1/40 inch in thickness. This dry sample is then weighed and immersed in sodium chloride solution of specific gravity 1.025 at 60° F. After 10 days soaking in such solution at a temperature of about 70° F. the sheet is removed, blotted so as to remove superficial liquid and weighed. The sample shall not have increased in weight by more than one percent of its original dry weight. With a sheet 1/40 inch thick 10 days submersion is long enough to insure maximum absorption when the process of removing soluble matters is nearing completion.

It will be understood that in manufacture it is not necessary to apply this test to every charge of the washing machine, but only with sufficient frequency to insure that the material will average less than one percent water absorption as determined by the above test by a reasonable margin. In practice it will be found that different charges of the washer will vary from .5 to 1.0 percent water absorption when a proper standard process is adopted. This variation is due to variation from bale to bale of the quality of the rubber, to the efficiency of creping rolls or washing machines or to inaccuracies of control of cleanliness or temperature of the water. The water soluble content will thus be reduced to an amount so small as to render osmotic swelling negligible. Whereas, it has heretofore been the practice to wash rubber for insulating purposes by a mechanical cleansing process designed to remove bark, sand and the like, this method as heretofore practiced, is not satisfactory for the present purpose, as a sufficiently extended mechanical working or kneading of the rubber excessively softens it, thereby reducing the rigidity of the rubber matrix in the finished insulation. This softening of the rubber also increases the tendency of the rubber insulation to deform during vulcanization and otherwise increases the difficulties of manufacture. We therefore prefer to reduce the rubber to the form of thin crepe so that much surface is exposed and to leach out the larger part of the soluble matters by prolonged soaking in clean water, as above described.

The procedure as above described is regarded as most commonly advantageous. However, it will be understood that the soaking period may be prolonged and the washing time shortened correspondingly or vice versa if the exigencies of manufacture require and the specific requirements permit. Satisfactory cable for certain conditions may even be made by omitting the soaking period altogether. However, the washing time has then to be lengthened greatly, the temperature has to be very carefully controlled and the rigidity of the material is liable to be somewhat sacrificed.

The method just described is the one now preferred, but it is within the scope of the invention to produce the improved submarine cable insulation by any other suitable method. For example, it may be found that recourse may be had to rubber in the form of the natural latex, from which by modified methods of coagulation, may be obtained rubber of lower water soluble content than that of rubber now available upon the market.

There has been described in the foregoing a test of the water absorptive properties of rubber, which for convenience is applied to the raw rubber in its unfilled state. We find, however, that a raw rubber of low absorptive capacity, when properly compounded with filling materials and sulphur and vulcanized in a manner adapted to submarine insulation, imparts to the finished insulation the property of low water absorption. Indeed in such cases it is found that the total water absorption of the finished insulation is equal to or slightly less than the sum of the amounts which are absorbed by the components respectively before mixing and vulcanizing. This constitutes a good criterion of the excellence of the compounding, forming and vulcanizing operation, for if there are pores in the insulation or voids about the filler particles or if the components contain appreciable amounts of soluble matter the finished insulation will absorb more water than the sum of the amounts absorbed by its components.

To determine whether the union between filler and matrix is of a sufficiently high order, after the ingredients have been separately tested and found satisfactory, and provided the usual precautions have been taken to avoid trapping of air in the compound during mixing, the above mentioned test for raw rubber is applied to the filled rubber vulcanized to the degree required for cable insulation; that is, a sample 1/40 inch thick is first dried and then immersed in the sodium chloride solution for ten days and the increase in weight noted. The rubber of the matrix will have been made to meet the test above specified. The results of that test are substantially the same whether it is applied to unvulcanized rubber or to rubber vulcanized to the same extent as is usual in cable insulating compounds. If the filler is a mineral such as fused silica it will per se absorb no water. In such a case and where, for example, the filler constitutes 50% by weight of the compound and the water absorption of the unvulcanized rubber of the matrix is 1%, the total absorption will amount to no more than .5% of the weight of the compound if the union between filler and matrix is good. Perfection cannot be quite obtained, of course, and the percentage of error in the method of testing is appreciable. The test, however, when allowance is made for these factors is practicable and satisfactory for application to the finished insulation. If this filling material is hard rubber its absorptive capacity can be separately determined. Similarly the absorptive power of other filling materials can be determined, those being preferred which are incapable of supporting osmotic action. The rubber matrix ordinarily forms from 30% to 60% by weight of the rubber insulating compounds.

When hard rubber dust is employed as the filler, the following is a suitable formula for the insulation.

| | Pounds |
|---|---|
| Rubber | 65 |
| Powdered hard rubber | 30 |
| Zinc oxide | 5 |
| Sulphur | 3 |
| Litharge | 6 |
| Paraffin | 1 |

These ingredients are thoroughly mixed together and the insulation thus prepared may be applied to the conductor or conductors of the cable according to the practice or preference of the cable maker as, for example, in the form of a tape crimped on the conductor, or by extrusion. The exact proportions are controlled largely by preference or experience in the method of mechanical application. The subsequent vulcanizing in certain instances has been done at 275° F. in about 1½ hours. It is to be understood that these details will vary over wide limits.

A suitable formula for the powdered vulcanized rubber is as follows:

| | Pounds |
|---|---|
| Rubber | 76 |
| Sulphur | 23 |
| Paraffin | 1 |

The rubber used for this purpose is preferably freed from soluble matter substantially to the same extent as that used to form the matrix. The mixture is vulcanized 10 hours at 50 pounds steam pressure, that is 298° F., after which the hard rubber thus obtained is ground to pass a 100 mesh sieve. The amount of combined sulphur in the hard rubber may vary widely; but rubber which is vulcanized sufficiently to permit easy grinding to a dust is preferable. The union between the rubber matrix and the hard rubber dust is so nearly perfect, when both are properly prepared, that the electrical stability is substantially independent of the size of filler particle. The filler is therefore preferably ground very fine so as to add to the mechanical strength of the compound. Likewise, it is desirable from the point of view of water absorption, as explained above, to employ a very hard variety of vulcanized rubber. The amount of free sulphur in the hard rubber dust should be maintained as low as possible so that there will not be present in the insulating compound enough free sulphur to attack the copper conductor or unduly vulcanize the insulating coating. If free sulphur is present in the powdered vulcanized rubber the proportions of sulphur subsequently added to the rubber composition may be correspondingly reduced.

Vulcanized rubber is most suitable as a filler for rubber insulation, but can also be used as filler for compositions comprising a matrix of material similar to rubber, such as gutta percha and other gums. Subsequent vulcanizing would then ordinarily be eliminated.

Although this invention has been developed entirely from the point of view of submarine cable insulation, it is obvious that the advance which it marks in the art of rubber insulation is general in its character so that the invention in certain of its aspects is not to be considered as limited to submarine cable insulation, but to be applicable to insulation to be used otherwise and especially where subjected to conditions of extreme humidity. The compound in which hard rubber dust filler is employed is particularly adapted for use as insulation for power conductors, or wherever the impressed voltage is high.

This application is, in part, a continuation, of the application, Serial No. 573,472, filed July 7, 1922.

What is claimed is:

An insulating material comprising rubber highly freed of water soluble materials, and a filler, the particles of said filler being such as will pass a sieve of 100 meshes per inch but will not pass a sieve greatly finer than 200 meshes per inch.

ROBERT R. WILLIAMS.
ARCHIE R. KEMP.